United States Patent
Bhogal et al.

(10) Patent No.: US 7,516,343 B2
(45) Date of Patent: Apr. 7, 2009

(54) ENHANCEMENTS TO IMPROVE THE FUNCTIONALITY AND EFFICIENCY OF BRICK POWER ADAPTERS

(75) Inventors: Kulvir S. Bhogal, Fort Worth, TX (US); Gregory J. Boss, American Fork, UT (US); Rick A. Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 11/425,606

(22) Filed: Jun. 21, 2006

(65) Prior Publication Data
US 2007/0300089 A1 Dec. 27, 2007

(51) Int. Cl.
*G06F 1/32* (2006.01)
(52) U.S. Cl. ............................ 713/320; 713/300
(58) Field of Classification Search .................. 713/300, 713/320
See application file for complete search history.

(56) References Cited
U.S. PATENT DOCUMENTS

| | | | | |
|---|---|---|---|---|
| 4,943,888 A | | 7/1990 | Jacob et al. | |
| 4,970,623 A | * | 11/1990 | Pintar | 361/187 |
| 5,408,668 A | * | 4/1995 | Tornai | 713/324 |
| 5,917,690 A | | 6/1999 | Anderson | |
| 6,307,764 B1 | | 10/2001 | Peek et al. | |
| 6,735,705 B1 | * | 5/2004 | Egbert et al. | 713/300 |
| 2001/0015903 A1 | | 8/2001 | Peek et al. | |
| 2008/0088293 A1 | * | 4/2008 | Beckman | 323/299 |

OTHER PUBLICATIONS

Caldwell, Chris and Reeder, Travis, "Power Supplies: A Hidden Opportunity for Energy Savings", National Resources Defense Council, May 2002, pp. 1-22.

\* cited by examiner

*Primary Examiner*—Mark Connolly
(74) *Attorney, Agent, or Firm*—Yee & Associates, P.C.; David A. Mims, Jr.

(57) ABSTRACT

The enhanced power supply adds a control circuit and rechargeable battery to the prior art transformer. The enhanced power supply uses an internal rechargeable battery in standby mode, so that the power supply does not draw AC power when the attached device is not in use. Control contacts on the power supply receptacle act as a communication channel allowing the attached device to power requirements to the power supply. The power supply has the ability to detect the power draw and switch between power modes, even when there is no communication with the attached device.

8 Claims, 2 Drawing Sheets

ENHANCEMENTS TO IMPROVE THE FUNCTIONALITY AND EFFICIENCY OF BRICK POWER ADAPTERS

FIELD OF THE INVENTION

The enhanced power supply relates generally to electrical power conversion systems, and specifically to an AC to DC adaptor using a microprocessor controller, an internal rechargeable battery and intelligent control contacts to reduce power consumption.

BACKGROUND OF THE INVENTION

Many of the home electronic products, particularly electronics such as small appliances, cordless phones and laptop computers use external power supplies called "wall-packs" or "bricks." These power supplies convert 120 volts of alternating current (AC) to the low voltage direct current (DC) used by most home electronic products. The DC voltage used by most target devices is commonly between 3V-14V. Most external power supplies are a linear power supply that use a transformer comprising two coils of wire and a magnetic field to lower voltage to the desired level. A bridge rectifier then converts the low voltage AC to DC. Other circuitry smoothes and filters the current to product a flat DC waveform. In operation, the transformer coils produce heat contributing to lost energy and a reduction in the effective life of the linear power supply.

Linear power supplies continue to draw power after the attached device using the power supply has been turned off. The amount of energy used by a power supply when the attached device is turned off is called the "standby power load." The standby power load generates waste heat which adds to the cooling load of a structure, and shortens the life of the power supply.

Chris Caldwell and Travis Reeder, in a May 2002 National Resources Defense Council publication, "Power Supplies: A Hidden Opportunity for Energy Savings," described the standby power load problem and known solutions to the problem. One known solution for dealing with the problem of standby power load eliminates the standby power load by manually turning off the power supply. Power supplies can be used on a power strip with a switch, or the power supply can have an integrated power switch so that consumers of electronic devices can turn off or unplug the power supply when it is not in use. While this solution may work for infrequently used devices such as battery chargers, it is not practical for other devices, such as a fax machine or an answering machine, that need to be ready to operate at any time.

Another known solution for addressing standby power load involves "switching" power supplies that use internal solid state electronics to switch between high (peak) load and low (standby) load modes depending on the needs of the attached device. Switching between high and low load modes can be achieved either by using multiple transformers corresponding to the different power demands, or by using "pulse width modulation." Pulse width modulation delivers power in a series of brief pulses. The switching power supply creates only the number of pulses necessary to meet the power demand, and skips pulses when demand is low. These switching power supplies reduce the standby power load, but do not totally eliminate the standby power load. Power supplies with pulse width modulation can increase peak load efficiency by supplying only the amount of power needed at any given time.

While switching between peak and standby modes can reduce the standby power load, a need exists for an intelligent power supply that automatically eliminates standby power load so that no AC power is drawn when the attached device is turned off.

SUMMARY OF THE INVENTION

The enhanced power supply adds a control circuit and rechargeable battery to the prior art transformer. The enhanced power supply uses an internal rechargeable battery in standby mode, so that the power supply does not draw AC power when the attached device is not in use. Control contacts on the power supply receptacle act as a communication channel allowing the attached device to power requirements to the power supply. The power supply has the ability to detect the power draw and switch between power modes, even when there is no communication with the attached device.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

Figure 1:
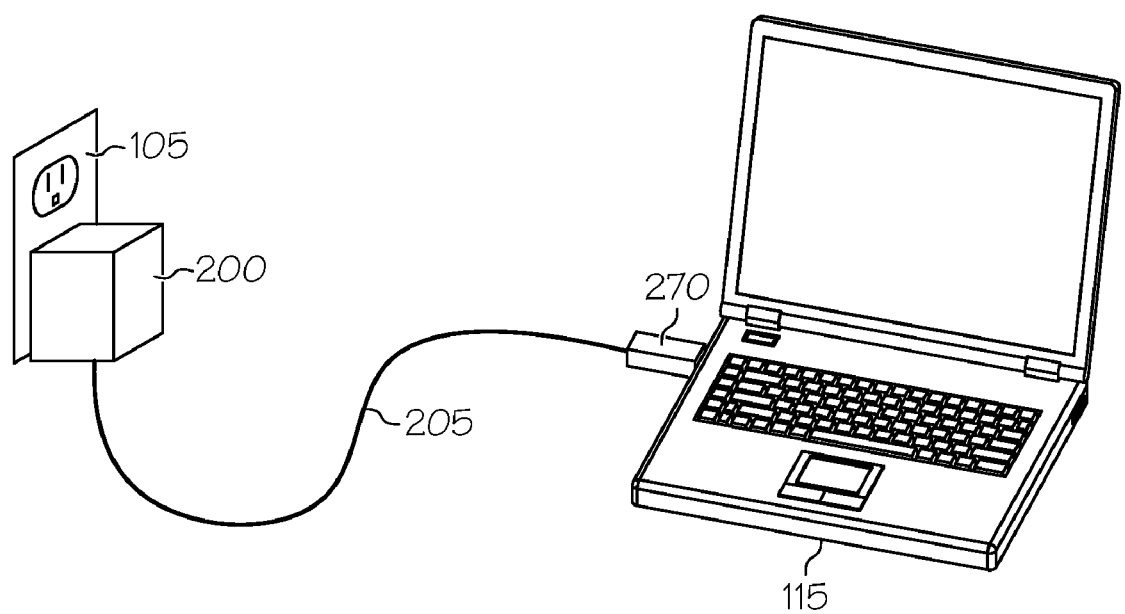
FIG. 1 is an external power supply attached to a computer.

Referring to FIG. 1, Enhanced Power Supply 200 is connected to outlet 105 is a 110 v 60 Hrz AC power outlet. Enhanced Power Supply 200 is an AC to DC converter plugged into power outlet 105. Power cord 205 is a power cord carrying DC power to receptacle 270 which plugs into target device 115 (shown here as a laptop computer.) Often, target device 115 has an internal battery for portable applications. The internal battery on target device 115 will be referred to as the "target battery." The actual configuration of receptacle 270 varies by model and manufacturer. A common configuration uses a coaxial pair of metal contacts extending from a plastic housing.

Figure 2:
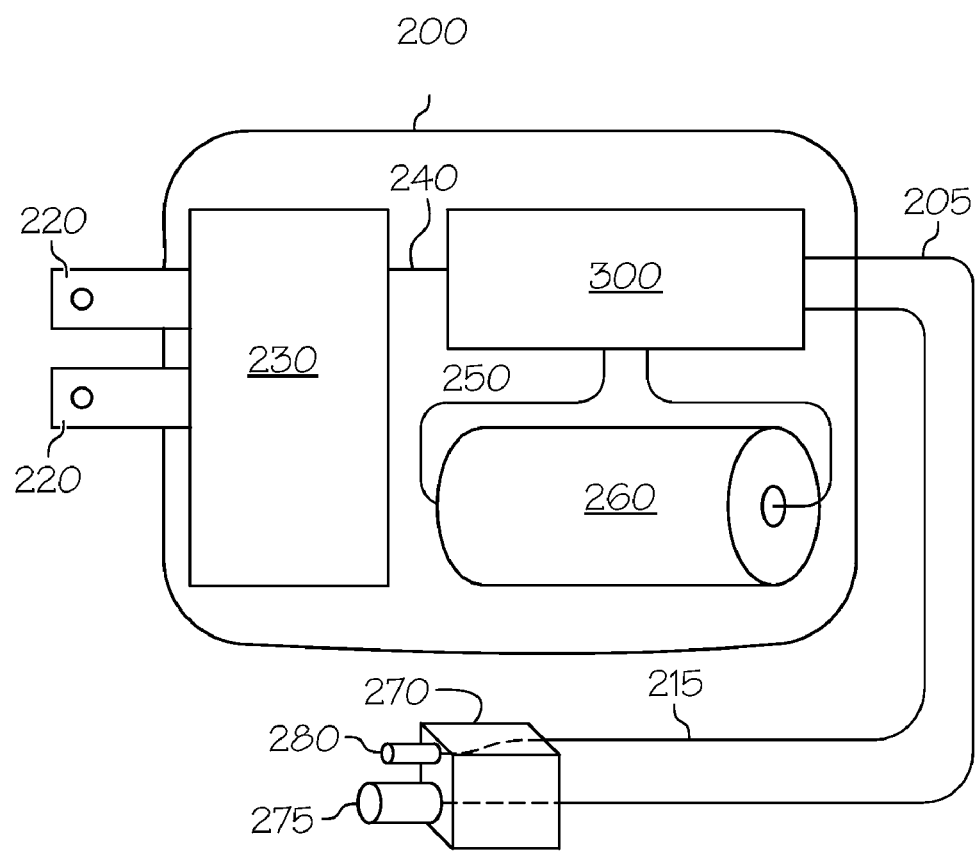
FIG. 2. shows components of the power supply.

FIG. 2 depicts the components of enhanced power supply 200. Prongs 220 plug into wall outlet 105. In other embodiments of Enhanced Power Supply 200, prongs 220 are replaced with a cord coupled with prongs for plugging into wall outlet 105. Transformer 230 converts 110V 60 Hrz AC power into DC power with a voltage required by target device 115, commonly between 6V-14V. Connector 240 delivers DC power to Switching Logic Component 300. Connectors 250 deliver DC power between Switching Logic Component 300 and local battery 260. In a preferred embodiment, Switching Logic Component 300 comprises a microprocessor, electronic switches and any necessary signal converters that enable the microprocessor to redirect current as required by the microprocessors programming. Switching Logic Component 300 may also include electrical measuring devices capable of detecting power load used by target device 115. Local battery 260 may be either a battery, a capacitor, or any other suitable charge holding component that can store power as required by Switching Logic Component 300. Switching Logic Component 300 charges local battery 260 when the charge decreases to a designated level. Local battery 260 supplies power to Switching Logic Component 300 when in standby mode, and can provide a trickle charge to recharge batteries in target device 115. Power cord 205 provides DC power from enhanced power supply 200 to receptacle 270. Metal contact 275 extends from receptacle 270 and plugs into to target device 115. Cable 215 extends from Switching Logic Component 300 to control contact 280 mounted to receptacle 270. Control contact 280 via cable 215 facilitate communication between target device 115 and Switching Logic Component 300. Control contact 280 in its simplest form is an open circuit with a switch that closes when physically connected with target device 115. The closed circuit indicates that enhanced power supply 200 is attached to target device 115. Other embodiments of control contact 280 allow target device 115 to electronically communicate with Switching Logic Component 300, to signal for increased or decreased power and to turn enhanced power supply 200 on or off.

Figure 3:
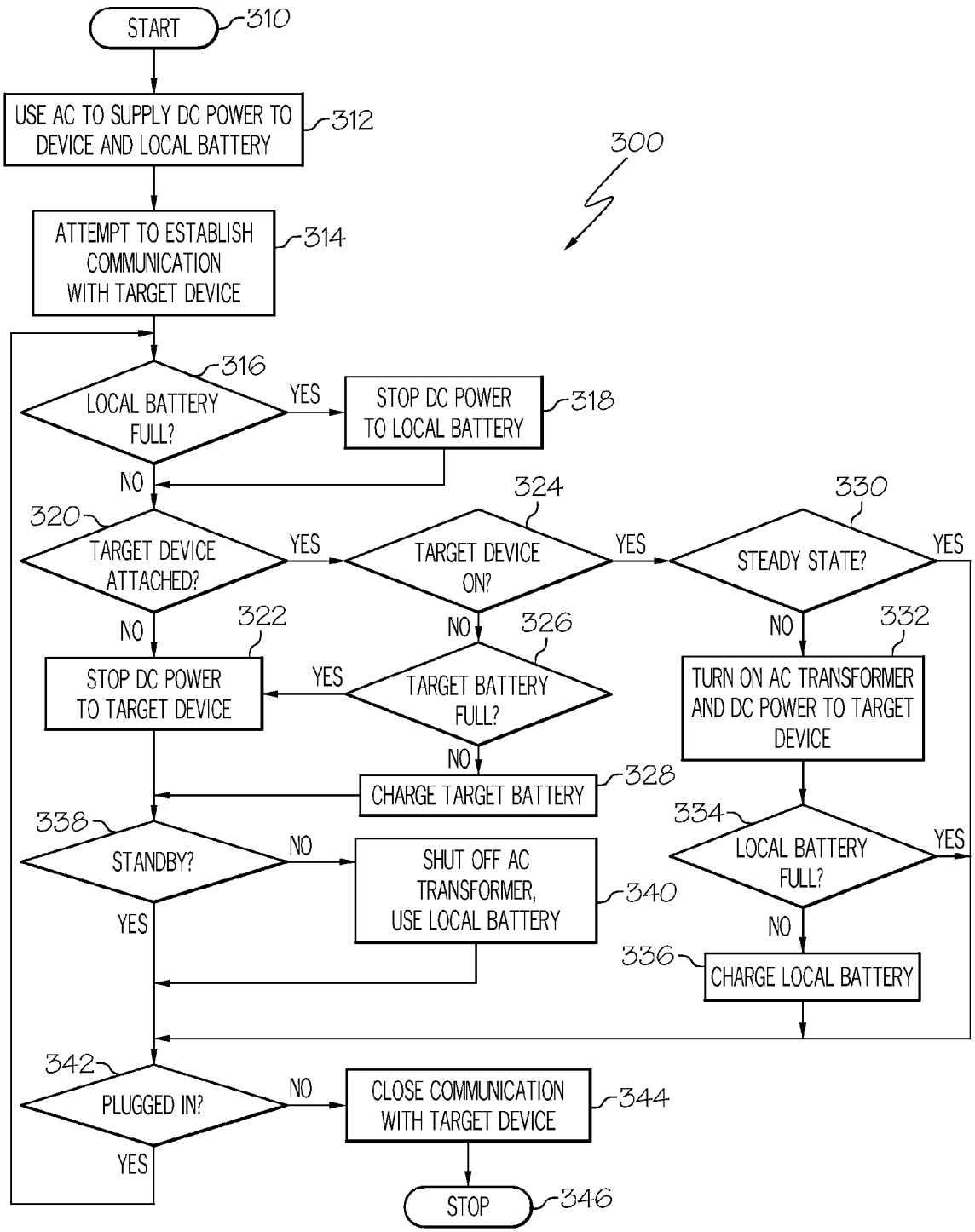
FIG. 3 is a flowchart of the power supply's switching logic.

FIG. 3 depicts a flowchart of the Switching Logic Component 300. Switching Logic Component starts when Enhanced Power Supply is plugged into an AC power source (310). Switching Logic Component 300 initializes the steady state power mode, converting the AC power into DC power to supply target device 115 and local battery 260. (312). Switching Logic Component 300 then attempts to establish a communication link with target device 115 (314) via control contact 280 and cable 215. If local battery 260 is fully charged or exceeds a preset threshold value (316), Switching Logic Component 300 stops supplying DC power to local battery 260 (318).

Switching Logic Component 300 determines if target device 115 is attached (320) in two ways. First, Switching Logic Component 300 can determine that target device 115 is attached by detecting current drawn through metal contact 275 via power cord 205. Otherwise, control contact 280 can signal via cable 215 whether target device 115 is connected to enhance power supply 200 by closing a circuit when receptacle 270 is physically plugged into target device 115, or by establishing a communication link with target device 115.

If target device 115 is not connected to enhanced power supply 200, then Switching Logic Component 300 stops supplying DC power through connector 205 (322). If target device 115 is connected to enhanced power supply 200, then Switching Logic Component 300 determines if target device 115 is turned on (324). Target device 115 is turned on if DC power is being drawn through connector 205. Switching Logic Component 300 can also use a communication link through connector 215 to determine if target device 115 is turned on. If target device 115 is turned off, Switching Logic Component 300 determines if the target battery on target device 115 is fully charged (326). If the target battery is fully charged, then Switching Logic Component 300 stops supplying DC power through connector 205 (322). If the target battery is not fully charged, Switching Logic Component 300 will continue to supply DC power through connector 205 to charge the target battery (328).

If Switching Logic Component 300 determines target device 115 is turned on (324), then Switching Logic Component 300 checks whether enhanced power supply 200 is at "steady state" (330), turns the transformer back on and starts the supply of DC power to target device 115 if needed (332). Enhanced power supply 200 is at "steady state" whenever the transformer is turned on and is supplying DC power to target device 115 (and to local battery 260 if local battery 260 is not fully charged). If local battery 260 is not fully charged (334), DC power is supplied to charge local battery 260 (336).

If target device 115 is not attached, or if target device 115 is turned off, Switching Logic Component 300 determines if enhanced power supply 200 is in "standby mode" (338). Standby mode occurs when transformer 230 is turned off and DC power is supplied by local battery 260. Enhanced power supply 200 in standby mode can provide a trickle charge from local battery 260 to target battery when target device 115 is powered off. If enhanced power supply 200 is not in standby mode, Switching Logic Component 300 shuts off the AC transformer and uses local battery 260 to supply DC power (340).

For as long as enhanced power supply 200 is plugged in or has AC power available (342), Switching Logic Component 300 will loop through steps (316-340) detecting the power requirements of target device 115, and switching between steady state and standby modes. Whenever the AC power is no longer supplied, Switching Logic Component 300 will shut down communication with target device 115 via control contact 280 and cable 215 (344) and stop (346).

In one embodiment of enhanced power supply 200, the functions of Switching Logic Component 300 are performed by target device 115. In this embodiment, control contact 280 and cable 215 acts as communication link between Switching Logic Component 300 and target device 115. While the communication link is active, Switching Logic Component 300 acts as a slave to target device 115. Whenever the communication link is lost, Switching Logic Component 300 reassumes control of enhanced power supply 200.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for reducing the power consumption of an AC to DC adaptor, the method comprising:
   converting AC power to DC power with a transformer on the adaptor;
   charging a local battery on the adaptor;
   supplying DC power to a detecting and switching mechanism on the adaptor;
   detecting the presence of a target electronic device attached to the adaptor;
   determining the power requirements of the target device;
   supplying DC power from the transformer to the target device when required;
   disabling the transformer when DC power is not needed by the target device; and
   using the local battery to supply DC power to the switching and detecting mechanism while the transformer is disabled.

2. The method of claim 1 wherein control contacts on a receptacle that couples with the target device detect the presence of the target device attached to the adaptor.

3. The method of claim 1 wherein measuring devices on the adaptor detect the power requirements of the target device attached to the adaptor.

4. The method of claim 1 wherein control contacts on a receptacle that couples with the target device enables the target device attached to the adaptor to control the detecting and switching mechanism on the adaptor.

5. An apparatus for reducing the power consumption of an AC to DC adaptor, the apparatus comprising:
   an AC to DC transformer;
   a detecting and switching mechanism attached to the transformer;

a local battery attached to the detecting and switching mechanism;

a switching logic program in the detecting and switching mechanism operable to charge the local battery, detect the presence of a target electronic device attached to the adaptor, determine the power requirements of the target device, supply DC power from transformer to the target device when required, disable the transformer when DC power is not needed by the target device and supply DC power to the switching and detecting mechanism from the local battery while the transformer is disabled.

6. The apparatus of claim 5 further comprising control contacts on a receptacle that couples with the target device to detect the presence of the target device attached to the adaptor.

7. The apparatus of claim 5 further comprising measuring devices on the adaptor detect the power requirements of the target device attached to the adaptor.

8. The apparatus of claim 5 further comprising control contacts on a receptacle that couples with the target device to enable the target device attached to the adaptor to control the detecting and switching mechanism on the adaptor.

\* \* \* \* \*